United States Patent
Bahman et al.

(10) Patent No.: US 10,947,676 B2
(45) Date of Patent: Mar. 16, 2021

(54) POINT SWITCH, AND RAILWAY NETWORK COMPRISING AT LEAST ONE POINT SWITCH OF SAID TYPE

(71) Applicant: SWISS TRANSPORTATION RESEARCH INSTITUTE AG, Küsnacht (CH)

(72) Inventors: Ramon Alexander Bahman, Küsnacht (CH); Aurelius Christian Bahman, Küsnacht (CH); Severin Alexis Bahman, Zurich (CH)

(73) Assignee: SWISS TRANSPORTATION RESEARCH INSTITUTE AG, Küsnacht (CH)

( * ) Notice: Subject to any disclaimer, the term of this patent is extended or adjusted under 35 U.S.C. 154(b) by 213 days.

(21) Appl. No.: 16/067,259

(22) PCT Filed: Feb. 20, 2017

(86) PCT No.: PCT/CH2017/000016
§ 371 (c)(1),
(2) Date: Jun. 29, 2018

(87) PCT Pub. No.: WO2017/143463
PCT Pub. Date: Aug. 31, 2017

(65) Prior Publication Data
US 2019/0010664 A1    Jan. 10, 2019

(30) Foreign Application Priority Data

Feb. 22, 2016 (CH) .......................... 0233/16

(51) Int. Cl.
*E01B 7/02* (2006.01)
*E01B 2/00* (2006.01)
(Continued)

(52) U.S. Cl.
CPC .............. *E01B 7/02* (2013.01); *B60L 13/003* (2013.01); *B61L 5/06* (2013.01); *E01B 2/003* (2013.01);
(Continued)

(58) Field of Classification Search
CPC . E01B 7/02; E01B 2/003; E01B 25/12; E01B 25/28; B60L 13/003; B61L 5/06; B61L 5/08
See application file for complete search history.

(56) References Cited

U.S. PATENT DOCUMENTS

2009/0235839 A1    9/2009  Stahn
2011/0271867 A1*   11/2011 Liu ........................ B60M 7/00
                                                   104/130.02
(Continued)

FOREIGN PATENT DOCUMENTS

CN       1339632 A     3/2002
CN     102673572 A     9/2012
(Continued)

OTHER PUBLICATIONS

Chinese Office Action in Corresponding CN Application No. 201780004987.6 dated Dec. 18 2019. 13 pages.
(Continued)

*Primary Examiner* — Jason C Smith
(74) *Attorney, Agent, or Firm* — Leason Ellis LLP

(57) ABSTRACT

A point switch is designed such that the point plates (1, 2) of the point switch which support the track (11, 12) are placed vertically on top of one another and that the position of the points is set by vertically moving the point plates.

8 Claims, 3 Drawing Sheets

(51) Int. Cl.
  *E01B 25/12* (2006.01)
  *E01B 25/28* (2006.01)
  *B60L 13/00* (2006.01)
  *B61L 5/06* (2006.01)
  *B61L 5/08* (2006.01)

(52) U.S. Cl.
  CPC .............. *E01B 25/12* (2013.01); *E01B 25/28* (2013.01); *B61L 5/08* (2013.01); *E01B 2202/027* (2013.01)

(56) References Cited

U.S. PATENT DOCUMENTS

| | | | |
|---|---|---|---|
| 2013/0082150 A1* | 4/2013 | Arnold | E01B 7/02 246/415 R |
| 2018/0100273 A1* | 4/2018 | Johansson | E01B 7/08 |
| 2019/0010664 A1* | 1/2019 | Bahman | E01B 7/02 |

FOREIGN PATENT DOCUMENTS

| | | |
|---|---|---|
| JP | 2010-537893 | 12/2010 |
| WO | 0034100 A1 | 6/2000 |
| WO | 0144577 A1 | 6/2001 |
| WO | 2008061728 A1 | 5/2008 |
| WO | 2009/032423 | 3/2009 |

OTHER PUBLICATIONS

International Search Report in corresponding International Patent Application No. PCT/CH2017/000016, dated May 16, 2017. 6 pages. (Translation attached.).

International Preliminary Report on Patentability in corresponding International Patent Application No. PCT/CH2017/000016, dated Feb. 9, 2018. 23 pages. (Translation attached.).

* cited by examiner ial point plate 2 is positioned below the point plate 1, wherein, in FIG. 1, the upper point plate 1 is shown as being "transparent" in order to make the underlying point plate 2 visible. On the top of the point plate 2, there is a track 12 for the track-bound vehicle, which is also only shown in part and merely indicated. In this case, the point plate 2 bears a curved track 12, which leaves from or merges into the track 11' and continues outside of the point plate 2 as track 12', merely indicated. The point plate 2, which bears the curved track, is also configured with a curved shape, in particular in the top view.

POINT SWITCH, AND RAILWAY NETWORK COMPRISING AT LEAST ONE POINT SWITCH OF SAID TYPE

CROSS-REFERENCE TO RELATED PATENT APPLICATIONS

This application is a U.S. National Stage Application under 35 U.S.C. § 371 of International Patent Application No. PCT/CH2017/000016, filed Feb. 20, 2017, which claims the benefit of priority under 35 U.S.C. Section 119(e) of Swiss Patent Application number CH 0233/16 filed Feb. 22, 2016, both of which are incorporated by reference in their entireties. The International Application was published on Aug. 31, 2017, as International Publication No. WO 2017/143463 A1.

FIELD OF THE INVENTION

The invention relates to a point switch and to a railway network comprising at least one such point switch.

BACKGROUND

Point switches in which a plate with a rigid straight track is replaced with a plate with a rigid curved track by displacement or rotation are already known. US 2011/0271867 A1 shows an example of a displaceable and also of a rotational point switch.

DESCRIPTION OF THE INVENTION

The objective of the invention is to create an improved point switch.

This objective is achieved with a point switch having the features of claim 1.

The point switch is therefore designed in such a manner that the track-supporting point plates of the point switch are arranged vertically one above the other and that the switch position is achieved by vertical movement of the point plates. It has been shown that a point switch is created, in particular, which takes up little space on the side of a track, while still offering the advantages of a point switch that has rigid tracks and therefore can be negotiated at high speeds. The point plates are basically plate-shaped components that accommodate and bear the respective track. The term "track" refers to any type of rail or rail pair, which can be negotiated by a track-bound vehicle adapted to the rail or the rail pair. This can be a conventional rail pair with any track width or a single rail that is encompassed by the vehicle.

Preferably, at least one of the point plates has a curved track, which is essentially curved in a clothoid shape. In this way, the ability of the point switch to be negotiated at high speeds is improved. Furthermore, the point switch is preferably structured in such a manner that a plurality of means for raising and lowering the point plates is provided along the outer sides of the point plates. This allows vertical displacement of the point plates even for large switch dimensions, as is desirable for negotiating them at high speeds. Furthermore, it is preferred that the point switch has multiple guide means along its external sides to guide the vertical movement of the point plates.

Furthermore, the aim of the invention is to create a railway network that allows space-saving arrangement of switches and is suitable for high speeds.

This task is accomplished with a railway network according to claim 7.

This results in the advantages mentioned in connection with the point switch.

This can be a railway network having tracks that are predominantly placed underground. In such a railway network, it is particularly advantageous to use point switches that save space laterally.

BRIEF DESCRIPTION OF THE DRAWINGS

Other embodiments, advantages, and uses of the invention are evident from the dependent claims and from the following description, based on the figures. These show:

WAY(S) OF IMPLEMENTING THE INVENTION

Figure 1:
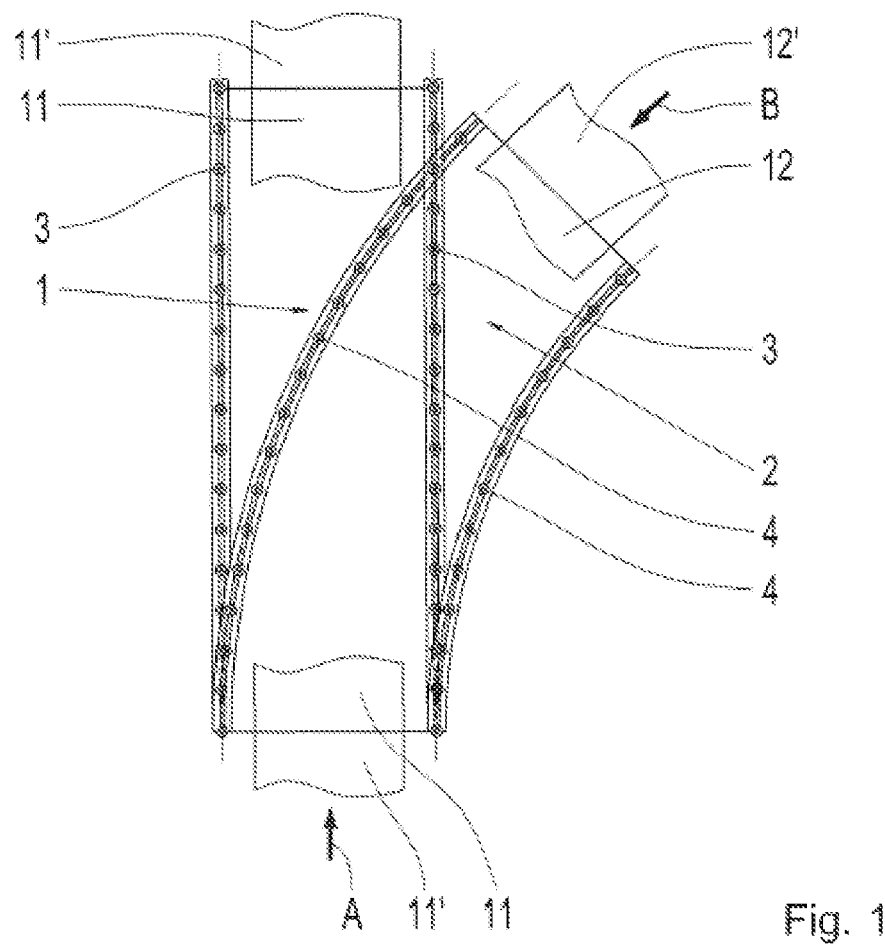
FIG. 1 schematically shows a top view of a point switch.

FIGS. 1 to 4 schematically show an exemplary embodiment of a point switch according to the invention. FIG. 1 shows a first point plate 1 of the point switch, which provides a track 11, shown only in part and merely indicated, for a track-bound vehicle. This track 11 runs straight and thereby continues a track 11' that runs straight outside of the switch, which is also merely indicated, in the straight direction of the latter. An additional point plate 2 is positioned below the point plate 1, wherein, in FIG. 1, the upper point plate 1 is shown as being "transparent" in order to make the underlying point plate 2 visible. On the top of the point plate 2, there is a track 12 for the track-bound vehicle, which is also only shown in part and merely indicated. In this case, the point plate 2 bears a curved track 12, which leaves from or merges into the track 11' and continues outside of the point plate 2 as track 12', merely indicated. The point plate 2, which bears the curved track, is also configured with a curved shape, in particular in the top view.

The terms "below" and "above" mean that the respective elements are placed vertically one above the other, point plate 1 being above point plate 2 in this example. This could also be the other way around. The term "track" means any kind of rail or rail pair, which can be negotiated by a suitable track-bound vehicle, which is designed for this rail or rail pair. This could be a conventional rail pair with any gauge or a single rail that is encompassed by the vehicle. In place of the indicated tracks that run on top of the respective point plate, tracks which are arranged on the underside of the point plate, so that the train hangs from the track, are also included here. A vehicle that is designed for the track could be any kind of track-bound vehicle, i.e. a train, a tram, a cable car, a monorail or another track-bound vehicle, and the point switch according to the invention can be provided for all these vehicles and their tracks, and the railway network containing the point switch can be configured in the manner mentioned above and provided for the vehicles mentioned. The term point plate refers, in the present invention, to any basically plate-shaped element that bears the rail or rails. This element can be formed in any desired manner.

Figure 2:
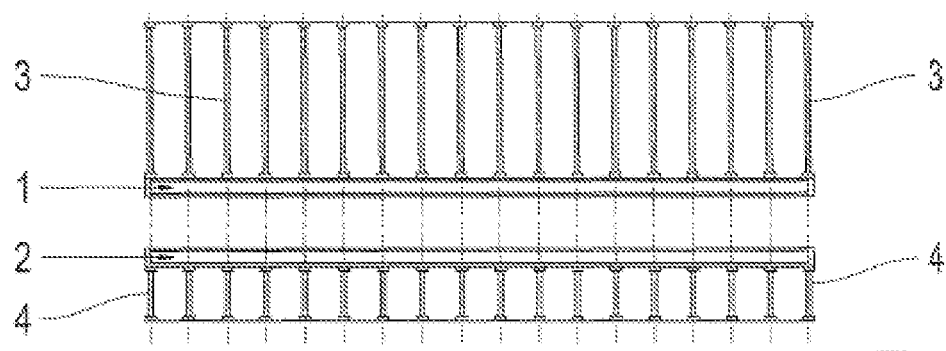
FIG. 2 schematically shows a longitudinal sectional view of an exemplary embodiment of a point switch according to the invention.
Figure 3:
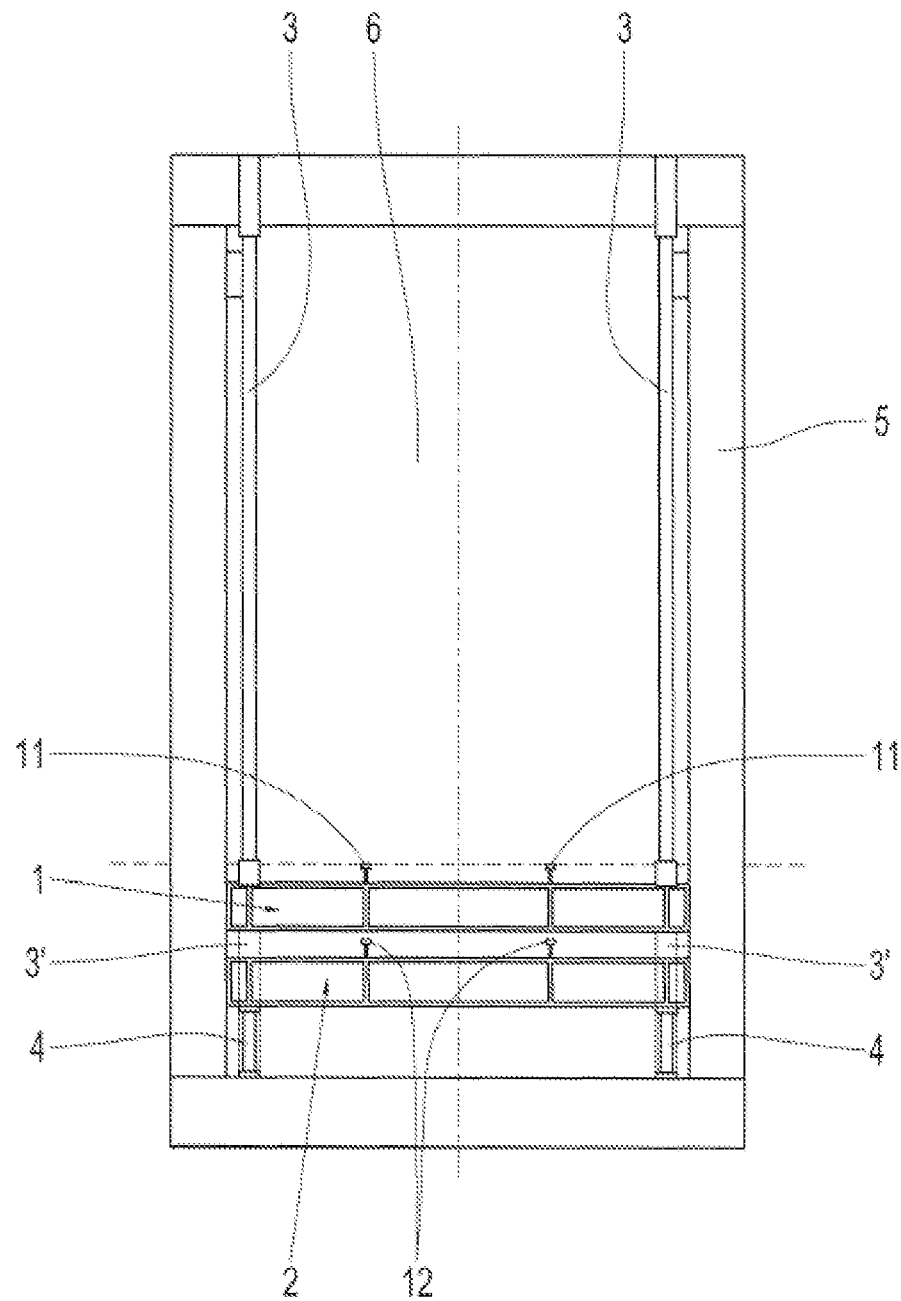
FIG. 3 schematically shows a cross-sectional view of the point switch in its position according to FIG. 2.
Figure 4:
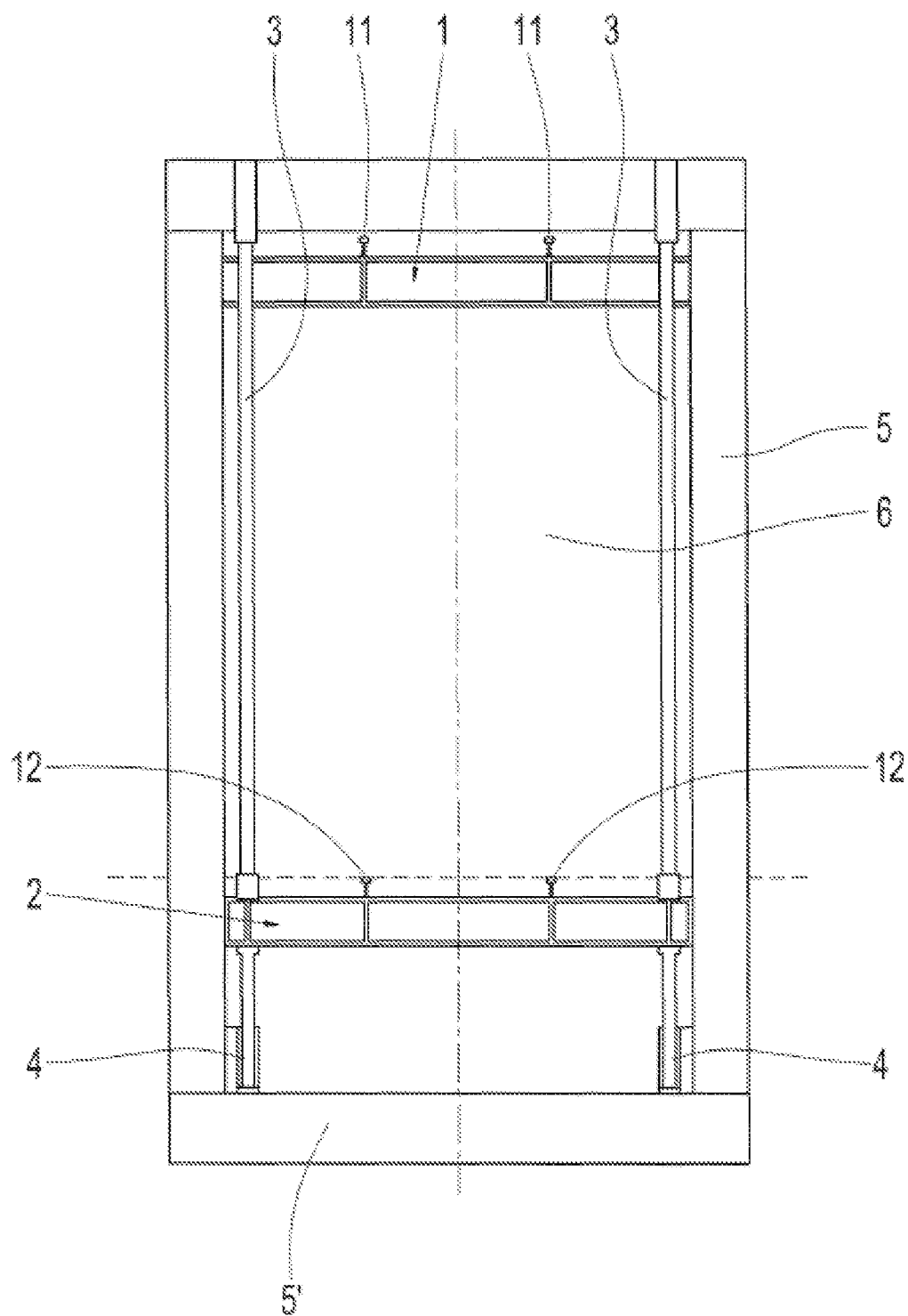
FIG. 4 schematically shows a cross-sectional view of the point switch according to FIG. 3, but with the position of the switch for the other switch position.

FIGS. 2 to 4 show a greatly simplified longitudinal or cross-sectional view of an exemplary embodiment of a point switch according to the invention. This can particularly be a point switch according to FIG. 1, and the same reference symbols as in FIG. 1 are used for the parts which have the same or a similar function.

FIGS. 2 and 3 show the point switch in a first switch position, in which the horizontally placed point plate 1 is located at a height, i.e. has a vertical position in which the track 11, which is positioned on the point switch 1, is aligned with the track 11' of the railway network outside of the point plate. A vehicle traveling on the railway network on the track 11' in the direction of the arrow A or in the direction opposite to the arrow A direction is therefore guided on the point plate 1 and is situated directly above the point plate 1 when traveling on the point switch in the space 6. In this example, the track positioned on the point plate 1 is a straight track 11, so that the vehicle passes through the point switch in a straight direction of travel. In FIG. 2 and FIG. 3, it is obvious that in this position, the point plate 2 is underneath the point plate 1, so that the track 12 of the point plate 2 is not in operation.

When the point switch is activated to provide the other switch position, the point plate 1 is raised vertically, and the point plate 2 is also raised vertically.

The point plate 2 is raised by such a distance that at the end of the raising movement, the horizontally lying point plate 2 is arranged at a height, i.e. has a vertical position in which the track 12 positioned on the point plate 2 is aligned with the track 11' of the railway network, on the one hand, and with the track 12' of the railway network, on the other hand. A vehicle traveling on the railway network on the track 11', in the direction of the arrow A, is therefore guided on the track 12 on the point plate 2 and is situated in the space 6 directly above the point plate 2 while passing through the point switch. In this example, the track positioned on the point plate 2 is a curved track 12, so that the vehicle passes through the point switch in a curved direction of travel. FIG. 2 and FIG. 4 show that in this position of the point switch, the point plate 1 has been raised or moved upward to such an extent that it is situated above the point plate 2, while keeping the space 6 through which the vehicle is supposed to travel clear. In this position, the track 11 of the point plate 1 is out of operation. The same situation applies when a vehicle passes through the railway network with the point switch in such a manner that coming from the track 12' in the direction B, it passes through the second point plate with the track 12 and is guided into the track 11' outside of the point switch.

The curved track section, as a transition arc, is preferably structured essentially in a clothoid shape, which is fundamentally known, in the case of conventional switches, for allowing travel through them at high speeds and good comfort.

In the switch position of FIGS. 2 and 3, the point plate 1 is positioned by means 3 and possibly also means 5, and is held rigidly in such a manner that it can fulfill the switch function and is stable for travel through it by a vehicle. In the switch position of FIGS. 2 and 4, the point plate 2 is positioned by means 4 and possibly also by means 5, and is held rigidly in such a manner that it can fulfill the switch function and is stable for travel through it by a vehicle. This can also be ensured for high speeds of the vehicle by means of a corresponding configuration of the means 3 or 4 and possibly 5. The point plates 1 and 2 are each structured as a rigid, essentially plate-shaped body, and can be formed from an iron construction or an iron-concrete construction or in some other way. The point plate can be designed as a grid-like component. It is essential that the respective point plate is suitable for accommodating the track and represents a plate-like component having sufficient strength so that vehicles traveling on the railway network can travel on it.

In the example shown, the means 3 are formed by a plurality of guides arranged on both sides of the point plate 1. In the example, these means simultaneously include the drive means for moving the point plate 1 vertically. In this regard, both the guide function and the drive for raising and lowering the point plate 1 can be combined in individual guide means 3. However, the means 3 can also be structured in such a manner that a part of the means 3 serves merely for guidance during the displacement of the point plate, and other parts of the means 3 bring about raising and lowering. The means 3 preferably also comprise supports 3', which support themselves on the solid substratum 5' and which form a contact surface for the point plate. The means for raising and lowering are then used only for this function and, in the position in which travel through the point plate is possible, it is held in position by the supports, so that the raising and lowering means are entirely or partially relieved of stress in this position.

In addition to the means 3 for guiding and raising and lowering that are shown, guide means and/or releasable fastening means can also be provided, which guide the respective point plate laterally into a support construction 5, in its position in which the vehicle passes through it, and/or hold it in place there in the switch position in which travel through the point plate takes place, in releasable manner.

The means 3 can be formed by column-like means, along which the point plate 1 can be moved vertically by such an amount that on the one hand, in the switch position of FIG. 3, the point plate 1 is in the position in which travel through it is possible and, on the other hand, in the switch position of FIG. 4, it is positioned in a position above the space 6, so as to release the space 6 for travel by the vehicle, which then runs on the point plate 2.

The drive for moving the point plates can be designed in any desired manner. On the one hand, a part of the column-like means 3 can be configured as threaded spindles. In this case, holders with inside threads, in which the threaded spindles come to lie, are provided on the point plate 1. By means of relative rotation of the threaded spindles and of the holders, a vertical movement can be brought about upward or downward (with reference to top and bottom, in particular in FIGS. 3 and 4). The column-like means 3, which are not structured as threaded spindles, serve as guides, in that corresponding guide means are provided in the point plate 1, which means surround the column-like means 3, at least in part. In this case, too, the point plate 1 can rest on supports 3' in the position in which travel is possible.

On the other hand, the means for raising and lowering can preferably also be structured as rope-type means. These can form a part of the column-shaped means 3, while the other column-shaped means 3 continue to be configured as guides. Possibly, all the means 3 are also configured in rope form, and additional guides are provided. The rope-type means for raising or lowering the point plate 1 can accordingly be shortened (raising) or extended again (lowering), by means of driven rope drums. Preferably, such rope-type raising means or lowering means are combined with the said supports 3' on which the point plate 1 rests, when it is in the position as shown in FIG. 1, in which travel is possible.

Displacement of the point plate 2, and preferably also its guidance, can be brought about by the column-like means 4. Other means, not shown, can also be present in the case of the point plate 2, which interact with the support construction 5 at the side of the point plate 2. In the embodiment shown, the column-like means 4 must provide a lesser vertical displacement path for the point plate 2 than is required for the point plate 1. Only displacement of the point plate 2 from the position of FIG. 3 to the position of FIG. 4 and back again is required. The column-like means 4 can be hydraulic raising means, for example. Part of the plurality of means can serve as driven raising means and lowering means, and another part of the means 4 can serve merely as guide means for the point plate 2 during raising and lowering. The point plate 2 can also be raised or lowered by rope-type raising and lowering means. Supports can also be provided for the point plate 2, by way of which supports the point plate 2 is supported in the position in which travel on it takes place, with regard to the substratum 5', so that the means for raising and lowering are completely or partially relieved of stress when travel through the point plate 2 with the track 12 situated on it takes place.

The drive of the means 3 and 4 can be structured in various ways by a person skilled in the art and can, in particular, be an electric motor and/or a hydraulic and/or pneumatic drive.

In the event that the vehicles traveling on the switches are supplied with traction current via the rail or the rails, means can be provided with which the traction current is switched between the tracks, so that the track not needed at a particular time is switched off. However, both tracks can also be continuously supplied with electricity. If the vehicles are supplied with traction current via an overhead contact line, the latter must be displaced with the point plate, in each instance. Possibly, the overhead contact line for the lower track can be arranged on the upper point plate. Embodiments of the overhead contact lines can be provided by a person skilled in the art, based on usual knowledge, and this will not be explained further here.

While preferred embodiments of the invention are described in the present application, it should be clearly pointed out that the invention is not restricted to these and can also be carried out in different manner, within the scope of the following claims.

The invention claimed is:

1. A point switch having a first point plate, which carries a first rigid track, and a second point plate, which carries a second rigid track, wherein the different switch positions are brought about by displacing the point plates, and wherein the point plates are arranged vertically one above the other and that the different switch positions are brought about by vertical displacement of both point plates, so that in a first switch position of said different switch positions the rigid track of the first switch plate defines the direction of travel provided by the point switch and in that in a second switch position of said different switch positions the rigid track of the second switch plate defines the direction of travel provided by the point switch.

2. The point switch according to claim 1, wherein the first rigid track is curved in the form of a clothoid and the second rigid track is straight.

3. The point switch according to claim 1, wherein for vertical displacement of the point plates, a plurality of means for raising and lowering the point plates are disposed along the outer sides of the point plates.

4. The point switch according to claim 1, wherein a plurality of guide means for guiding the vertical movement of the point plates are provided along the outer sides of the point plates.

5. The point switch according to claim 1, wherein the first and second point plates are supported on supports, when moved relative to a substratum.

6. The point switch according to claim 1, wherein the first track and the second track each comprise one of a single rail and a pair of parallel rails.

7. A railway network having at least one-point switch according to claim 1.

8. The railway network according to claim 7, wherein the first track and the second track are arranged predominantly underground.

* * * * *